L. N. AMANS & J. C. GIFFORD.
ANTISLIPPING DEVICE AND TIRE PROTECTOR WITH TIGHTENER FOR PNEUMATIC TIRE WHEELS.
APPLICATION FILED APR. 4, 1917.
1,284,548.
Patented Nov. 12, 1918.
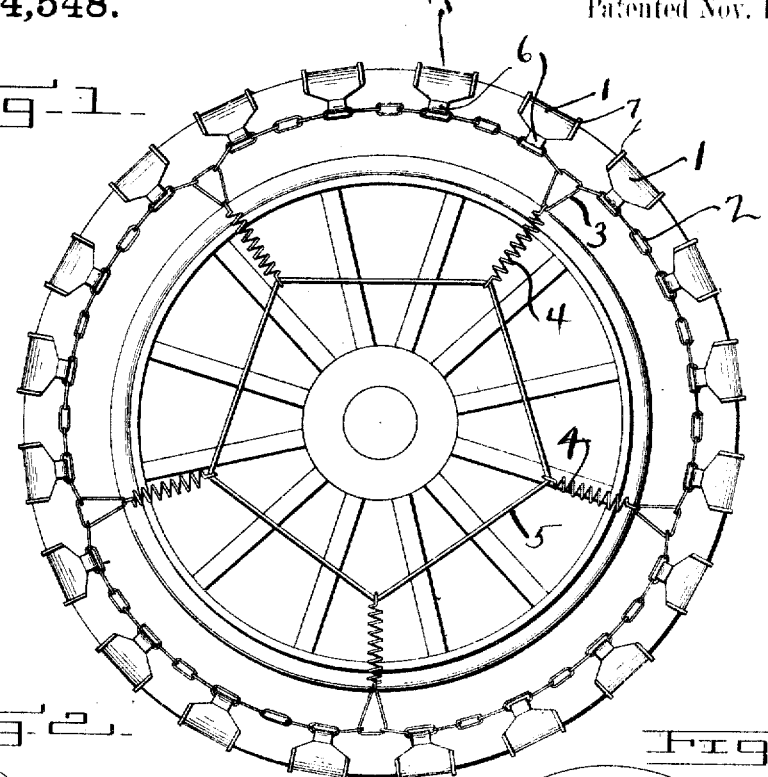
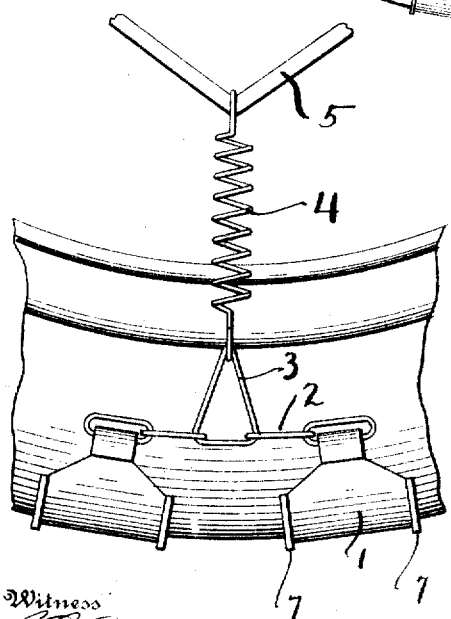
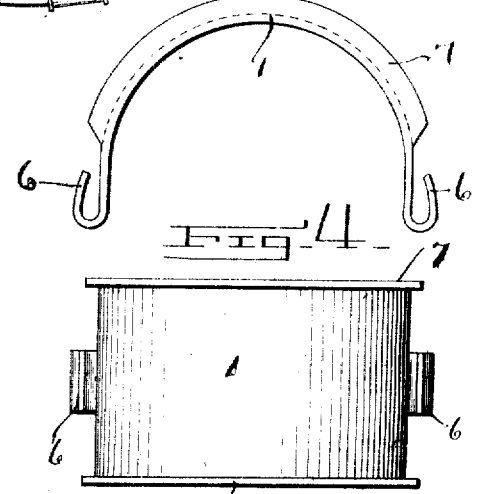

UNITED STATES PATENT OFFICE.

LOUIS N. AMANS AND JOHN C. GIFFORD, OF ALBERTON, MONTANA.

ANTISLIPPING DEVICE AND TIRE-PROTECTOR WITH TIGHTENER FOR PNEUMATIC-TIRE WHEELS.

1,284,548.

Specification of Letters Patent. Patented Nov. 12, 1918.

Application filed April 4, 1917. Serial No. 159,712.

*To all whom it may concern:*

Be it known that we, LOUIS N. AMANS and JOHN C. GIFFORD, citizens of the United States, residing at Alberton, in the county of Mineral and State of Montana, have invented new and useful Improvements in Antislipping Devices and Tire-Protectors with Tighteners for Pneumatic-Tire Wheels, of which the following is a specification.

The object of our invention is to provide a device to prevent slipping and skidding, to protect the tire, and adapted to exert constant pressure on the tire, the device being arranged to tighten automatically. It is further our object to provide novel mud and ice cleats of steel, secured to the tire by novel means susceptible of both quick and easy application and removal.

We attain the objects of our invention by the mechanism illustrated in the accompanying drawings, in which—

Figure 1 is a side elevation of our invention applied to a wheel; Fig. 2 is a detail elevation of the spring employed; Fig. 3 is an edge view of the tire protecting cleat; and Fig. 4 is a plan of same.

Similar characters of reference designate similar parts throughout the several views.

Referring to the drawings, we provide tire protecting cleats 1 shaped to fit over the tire, the cleats having integral hooks 6 as shown. Cleats 1 are provided with upturned flanges 7 to give better traction. The cleats are of steel, preferably, and arranged in spaced relation so that hooks 6 may engage alternate links of side chains 2. Chains 2 encircle the wheel on each side of the tire and are provided at regular intervals—preferably five—with triangular links 3. Attached to links 3 are springs 4, which are secured to the angular portions of an equilateral frame of iron the sides of which correspond in number with the number of triangular links on each side of the wheel. We provide an angular metal frame 5, said frame preferably having five angles. Triangular links 3 are not equilateral, so that when the spring is unhooked the chain can be slackened and easily removed. When the springs are hooked they take up all slack in the chain.

What we claim is:

In a device of the class described, a plurality of spaced tire protective elements engaging over the tire, means securing said protective elements in spaced relation over the tire, and means for resiliently holding the tire protective members in non-rigid engagement over the tires to permit of a slight creeping movement, radially disposed springs linked to the aforesaid means securing the tire protective elements in spaced relation, and an equilateral frame on opposite sides of the wheel to the angular portions of which the springs are secured, whereby to readily and releasably mount the tire protective elements over the tire and to effect the automatic tightening of the protective elements whenever increased strain is exerted on them owing to traction conditions.

LOUIS N. AMANS.
JOHN C. GIFFORD.